United States Patent Office 3,081,133
Patented Mar. 12, 1963

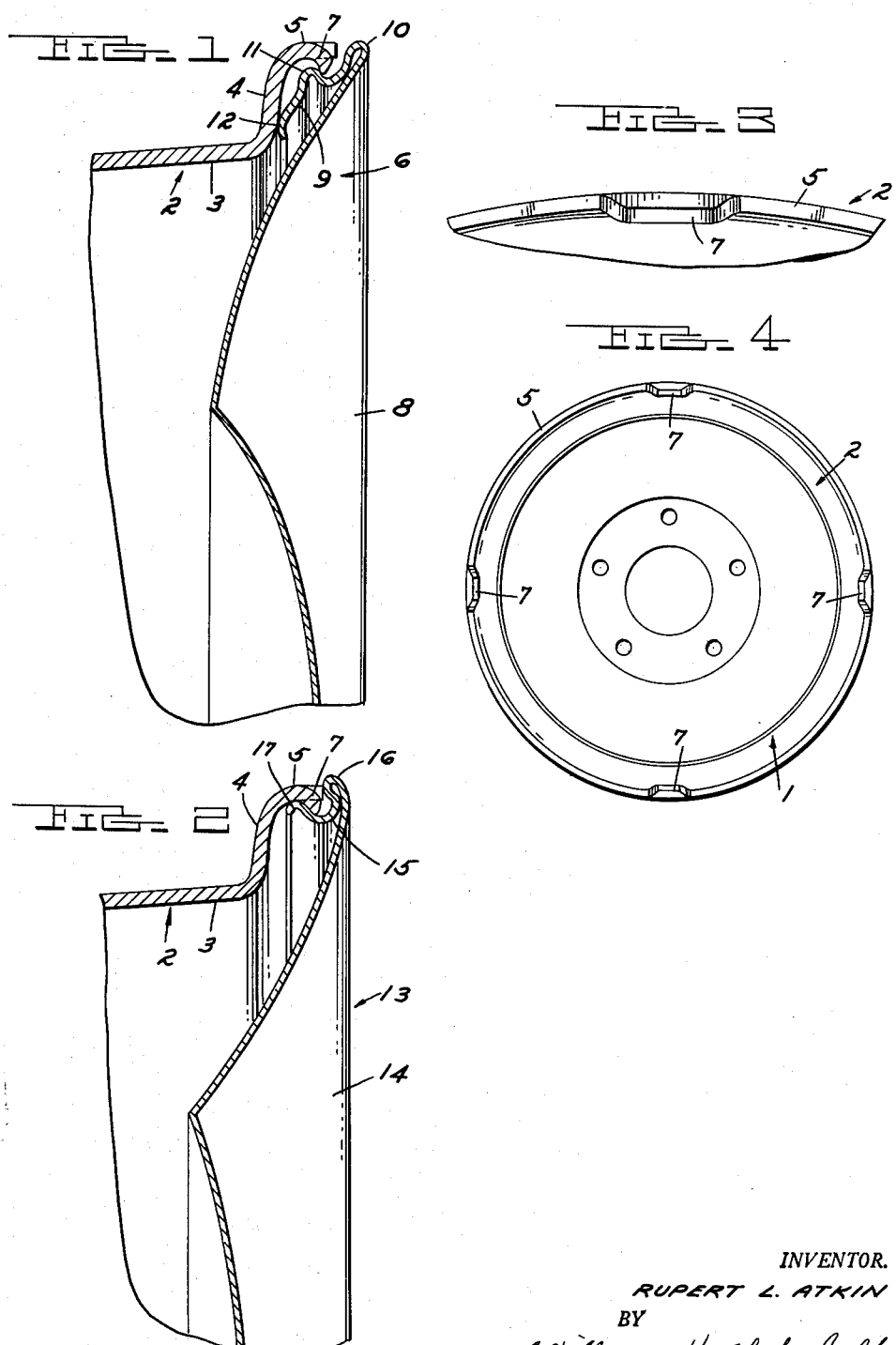

3,081,133
WHEEL AND COVER ASSEMBLY
Rupert L. Atkin, Grosse Pointe Woods, Mich., assignor to Kelsey-Hayes Company, Detroit, Mich., a corporation of Delaware
Filed May 25, 1959, Ser. No. 815,419
6 Claims. (Cl. 301—37)

This invention relates to wheel and cover assemblies and refers more particularly to motor vehicle wheel and cover assemblies in which the wheels have pneumatic tire rims.

The invention has for one of its objects to provide an improved wheel and cover assembly in which an axially extending terminal flange is provided at the radially outer edge of the tire retaining flange of a rim, having means for retaining a cover on the wheel.

The invention has for a further object to provide an improved wheel and cover assembly in which the terminal flange is formed at its axially outer edge with a plurality of angularly spaced integral radially inwardly offset cover retaining portions, and the cover has means engageable with the retaining portions to hold the cover on the wheel.

Other objects and features of the invention will become apparent as the description proceeds, especially when taken in conjunction with the accompanying drawing, illustrating preferred embodiments of the invention, wherein:

FIG. 1 is a fragmentary radial sectional view of a wheel and cover assembly embodying the invention;

FIG. 2 is a similar to FIG. 1 showing a modification;

FIG. 3 is a fragmentary outboard elevation showing a portion of the rim; and

FIG. 4 is an outboard elevation, on a reduced scale, of the wheel with the cover removed.

Referring now more particularly to the drawing, the wheel is a motor vehicle wheel having the wheel body 1 which is in the form of a disk, and a tire rim 2 encircling and secured to the wheel body by any suitable means. The tire rim has an annular base 3 and the axially spaced radially outwardly projecting annular tire retaining flanges, only the outboard flange being shown and indicated at 4. The portions of the base adjacent the tire retaining flanges serve as bead seats for the tire. The outboard tire retaining flange 4 terminates at its radially outer extremity in a generally axially outwardly extending annular terminal flange 5, and a cover 6 extends over the wheel body and rim and is detachably secured to the rim.

The axially outwardly extending terminal flange 5 is formed to provide in its outer edge a plurality of equally circumferentially spaced radially inwardly depressed or offset retaining portions 7 which are formed by simply pressing the retaining portions radially inwardly from the flange. In the present instance four such retaining portions are provided. The cover 6 is of one-piece construction and has a cover plate portion 8 and an annular flexible resilient ring portion 9. The portions 8 and 9 of the cover are integrally connected by a circular bead 10 about the periphery of the cover plate portion of a diameter approximating that of the terminal flange 5. The ring portion 9 has the illustrated cross-section throughout its extent and has an annular rib 11 which extends within the terminal flange 5 in assembled relation axially inwardly of the retaining portions 7 to resiliently engage and be retained by the retaining portions. The opposite or inner edge 12 of the ring portion 9 resiliently abuts the tire retaining flange 4 in assembled condition to hold the rib 11 and retaining portions 7 in resilient engagement, to prevent rattling.

The cover is assembled on the wheel by simply pressing it into position, the ring portion 9 flexing radially inwardly so that the rib 11 thereof may clear the retaining portions 7 and snap in behind or at the axially inner side of the retaining portions with the inner edge 12 of the ring portion resiliently and yieldably bearing against the tire retaining flange. The cover completely conceals the rim and wheel body from the outboard side and may be removed readily by inserting a screw driver or other prying tool between the bead 10 and the outer edge of the terminal flange 5.

FIG. 2 illustrates a modification in which the wheel body and rim are of the same construction, but the cover 13 is of somewhat different construction. The cover 13 is of one-piece construction and has a cover plate portion 14 and an annular flexible resilient ring portion 15. The portions 14 and 15 of the cover are integrally connected by a circular bead 16 about the periphery of the cover plate portion 14 of a diameter approximating that of the terminal flange 5. The ring portion 15 has the illustrated cross-section throughout its extent and has an inner annular terminal rib 17 which, in the assembled condition, extends within the terminal flange 5 behind or at the axially inner side of the retaining portions 7 to engage and be retained thereby. The ring portion 15 is resiliently held in engagement with the retaining portions 7 by the engagement of bead 16 with the outer edge of the terminal flange 5.

The cover is assembled on the wheel by simply pressing it into position, the ring portion 15 being sufficiently flexible to flex radially inwardly allowing its inner rib 17 to clear the retaining portions 7 and snap in behind or at the axially inner side of the retaining portions. The inner extremity of the annular rib 17 is flared radially inwardly to facilitate pressing the cover into assembled position. The cover is easily removed by inserting a screw driver or other prying tool between the bead 16 and the retaining portions 7 which, as seen in FIG. 2, provide the necessary clearance.

What I claim as my invention is:

1. In a wheel and cover assembly, a wheel comprising a wheel body, a tire rim encircling and secured to said wheel body and having a tire retaining flange terminating in a generally axially outwardly extending annular terminal flange, a cover extending over said wheel body and rim including cover plate and annular flexible ring portions integrally and resiliently connected together by a circular peripheral bead having a diameter at least equal to the outside diameter of the annular flange so as to radially overlap the outer edge of said annular flange and conceal the same from the outboard side, means for releasably holding said cover on said wheel including a plurality of circumferentially and equally spaced integral cover retaining portions on the outer edge of said annular flange offset radially inwardly relative thereto, and an integral annular radially outwardly projecting rib on said ring portion, said ring portion extending within said annular flange with said rib axially inwardly of said retaining portions, said rib being radially overlapped by said retaining portions and resiliently engaging the axially inner sides thereof to be retained thereby, said ring portion having a terminal edge spaced axially inwardly from said rib in axial pressure engagement with the axially outer side of said tire retaining flange to hold said rib engaged with said retaining portions of said annular flange.

2. In a wheel and cover assembly, a wheel comprising a wheel body, a tire rim encircling and secured to said wheel body and having a radially extending tire retaining flange terminating in a laterally outwardly extending annular flange, a cover extending over said wheel body and rim including cover plate and annular flexible ring portions integrally and resiliently connected together by a circular peripheral bead having a diameter equal to the outside diameter of the annular flange and radially overlapping the outer edge of said annular flange to conceal the same from the outboard side, means for releasably holding said cover on said wheel including a plurality of circumferentially spaced integral cover retaining portions pressed radially inwardly from said annular flange at the outer free edge thereof, said annular flexible ring portion being upon the inner side of said cover plate portion and including two oppositely opening integrally connected channel-shaped portions disposed side by side, one opening outwardly and straddling said retaining portions, the other opening inwardly and being disposed axially inwardly of said retaining portions, the outer side of said other channel-shaped portion being radially overlapped by said retaining portions and resiliently engaging the axially inner sides thereof to be retained thereby.

3. The structure defined in claim 2, wherein the inner side of said other channel-shaped portion is curved radially inwardly to facilitate pressing the cover into assembled relation with said cover retaining portions.

4. The structure defined in claim 2, wherein the inner side of said other channel-shaped portion has a terminal edge in axial pressure engagement with the axially outer side of said tire retaining flange to hold said other channel-shaped portion engaged with the retaining portions of said annular flange.

5. In a wheel and cover assembly, a wheel comprising a wheel body, a tire rim encircling and secured to said wheel body and having a tire retaining flange terminating in a generally axially outwardly extending annular terminal flange, a cover extending over said wheel body and rim including cover plate and annular flexible ring portions integrally and resiliently connected together by a circular peripheral bead having a diameter at least equal to the outside diameter of the annular flange so as to radially overlap the outer edge of said annular flange to conceal the same from the outboard side thereof, means for releasably holding said cover on said wheel including a plurality of circumferentially and equally spaced integral cover retaining portions pressed radially inwardly from said annular flange at the outer free edge thereof, and an integral annular inwardly opening U-shaped rib projecting radially outwardly from said ring portion, said ring portion extending within said annular flange with said rib disposed axially inwardly of said retaining portions, the outer side of said annular U-shaped rib being radially overlapped by said retaining portions and resiliently engaging the axially inner sides thereof to be retained thereby, the inner side of said annular U-shaped rib being curved radially inwardly to facilitate pressing the cover into assembled relation with said cover retaining portions.

6. In a wheel and cover assembly, a wheel comprising a wheel body, a tire rim encircling and secured to said wheel body and having a tire retaining flange terminating in a generally axially outwardly extending annular terminal flange, a cover extending over said wheel body and rim including cover plate and annular flexible ring portions integrally and resiliently connected together by a circular peripheral bead having a diameter at least equal to the outside diameter of the annular flange so as to radially overlap the outer edge of said annular flange to conceal the same from the outboard side thereof, means for releasably holding said cover on said wheel including a plurality of circumferentially and equally spaced integral cover retaining portions pressed radially inwardly from said annular flange at the outer free edge thereof, and an integral annular inwardly opening U-shaped rib projecting radially outwardly from said ring portion, said ring portion extending within said annular flange with said rib disposed axially inwardly of said retaining portions, the outer side of said annular U-shaped rib being radially overlapped by said retaining portions and resiliently engaging the axially inner sides thereof to be retained thereby, said bead being in axial pressure surface to surface engagement with the outer edge of said annular terminal flange to firmly hold the outer side of said rib engaged with the inner sides of said retaining portions of said annular terminal flange, the inner side of said annular U-shaped rib being curved radially inwardly to facilitate pressing the cover into assembled relation with said cover retaining portions.

References Cited in the file of this patent

UNITED STATES PATENTS

| | | |
|---|---|---|
| 2,308,904 | Wood | Jan. 19, 1943 |
| 2,624,640 | Lyon | Jan. 6, 1953 |
| 2,631,066 | Horn | Mar. 10, 1953 |
| 2,669,487 | Horn | Feb. 16, 1954 |
| 2,860,922 | Lyon | Nov. 18, 1958 |
| 2,998,995 | Lyon | Sept. 5, 1961 |
| 3,036,867 | Lyon | May 29, 1962 |

FOREIGN PATENTS

| | | |
|---|---|---|
| 503,270 | Great Britain | Apr. 4, 1939 |
| 798,159 | Great Britain | July 16, 1958 |
| 830,302 | Germany | Feb. 4, 1952 |
| 529,974 | Canada | Sept. 4, 1956 |